(12) United States Patent
Adelson et al.

(10) Patent No.: US 7,685,190 B2
(45) Date of Patent: *Mar. 23, 2010

(54) METHOD AND SYSTEM FOR AN ONLINE-LIKE ACCOUNT PROCESSING AND MANAGEMENT

(75) Inventors: Richard A. Adelson, Newington, CT (US); Kathleen Barrett, Enfield, CT (US); Doug Bendel, West Hartford, CT (US); Keven J. Busque, Manchester, CT (US); Daniel B. Chaput, Mansfield Ctr., CT (US); Marie T. Engel, Ellington, CT (US); Marshall Kaplan, West Hartford, CT (US); Beverly I. Kirby, Enfield, CT (US); John Lamb, Newtown, CT (US); Nora Medina, Madison, WI (US); Sandra J. Meyerhofer, Berlin, CT (US); Jeffrey J. Ryan, W. Simsbury, CT (US); Jean A. Sirica, Naugatuck, CT (US); Mark J. Smith, West Hartford, CT (US); James Tsokalas, Hebron, CT (US); M. Kathleen Williams, Barkhamsted, CT (US)

(73) Assignee: The Hartford, Hartford, CT (US)

( * ) Notice: Subject to any disclaimer, the term of this patent is extended or adjusted under 35 U.S.C. 154(b) by 338 days.

This patent is subject to a terminal disclaimer.

(21) Appl. No.: 11/641,558

(22) Filed: Dec. 19, 2006

(65) Prior Publication Data

US 2007/0156556 A1    Jul. 5, 2007

Related U.S. Application Data

(63) Continuation of application No. 09/818,708, filed on Mar. 27, 2001, now Pat. No. 7,174,318.

(60) Provisional application No. 60/192,715, filed on Mar. 28, 2000.

(51) Int. Cl.
G06F 7/00 (2006.01)
G06Q 40/00 (2006.01)

(52) U.S. Cl. .......................... 707/704; 707/781; 705/35

(58) Field of Classification Search .................. 705/35; 707/4, 1, 8
See application file for complete search history.

(56) References Cited

U.S. PATENT DOCUMENTS

| 4,958,291 | A | | 9/1990 | Mamone et al. | |
|---|---|---|---|---|---|
| 5,182,705 | A | | 1/1993 | Barr et al. | |
| 5,197,002 | A | | 3/1993 | Spencer | |
| 5,696,906 | A | | 12/1997 | Peters et al. | |
| 5,704,044 | A | * | 12/1997 | Tarter et al. | 705/4 |

(Continued)

Primary Examiner—Etienne P LeRoux
Assistant Examiner—Cindy Nguyen
(74) Attorney, Agent, or Firm—Howard IP Law Group, PC

(57) ABSTRACT

The present invention is embodied in an online-like transaction processing method and system for processing account information contained in batch process files, the method including: reading at least one batch file containing a plurality of records, each of the plurality of records being related to an associated one of a plurality of accounts; identifying which of the plurality of records relate to same ones of the plurality of accounts; identifying one of the accounts; and, processing all of the records identified as relating to the one of the accounts together and independent of processing any of the records relating to any other of the plurality of accounts.

15 Claims, 6 Drawing Sheets

U.S. PATENT DOCUMENTS

| | | |
|---|---|---|
| 5,812,989 A | 9/1998 | Witt et al. |
| 5,819,226 A | 10/1998 | Gopinathan et al. |
| 5,819,259 A | 10/1998 | Duke-Moran et al. |
| 5,850,442 A | 12/1998 | Muftic |
| 5,884,290 A | 3/1999 | Smorodinsky et al. |
| 5,890,140 A * | 3/1999 | Clark et al. .................... 705/35 |
| 5,940,813 A | 8/1999 | Hutchings |
| 5,950,169 A | 9/1999 | Borghesi et al. |
| 5,956,700 A | 9/1999 | Landry |
| 5,991,733 A | 11/1999 | Aleia et al. |
| 6,023,705 A | 2/2000 | Bellinger et al. |
| 6,026,368 A | 2/2000 | Brown et al. |
| 6,092,055 A | 7/2000 | Owens et al. |
| 6,108,641 A | 8/2000 | Kenna et al. |
| 6,154,879 A | 11/2000 | Pare, Jr. et al. |
| 6,269,343 B1 | 7/2001 | Pallakoff |
| 6,343,279 B1 * | 1/2002 | Bissonette et al. ............ 705/41 |
| 6,347,302 B1 | 2/2002 | Joao |
| 6,386,444 B1 | 5/2002 | Sullivan |
| 6,477,513 B1 | 11/2002 | Walker et al. |
| 7,050,996 B1 | 5/2006 | Blagg et al. |
| 7,117,172 B1 * | 10/2006 | Black ........................... 705/35 |
| 7,133,835 B1 * | 11/2006 | Fusz et al. .................... 705/26 |
| 2001/0037224 A1 | 11/2001 | Eldridge et al. |
| 2002/0022976 A1 | 2/2002 | Hartigan |
| 2002/0147867 A1 | 10/2002 | Satlow |

* cited by examiner

METHOD AND SYSTEM FOR AN ONLINE-LIKE ACCOUNT PROCESSING AND MANAGEMENT

RELATED APPLICATION

This application is a continuation of U.S. patent application Ser. No. 09/818,708, entitled "METHOD AND SYSTEM FOR AN ON-LINE LIKE ACCOUNT PROCESSING AND MANAGEMENT", filed Mar. 27, 2001, now U.S. Pat. No. 7,174,318 issued Feb. 6, 2007, which claims the benefit under 35 U.S.C. 119 (e) of U.S. Provisional Application Ser. No. 60/192,715, filed Mar. 28, 2000, the entire contents of all of which are herein incorporated by reference for all purposes.

FIELD OF INVENTION

The present invention relates to records processing techniques and more particularly a processing technique for enabling processing of batch records in an online-like manner.

BACKGROUND OF INVENTION

The present invention will be described as it relates to insurance accounts management systems and techniques, however, it should be understood to be equally applicable to other industries and records processing systems as well.

Batch processing account management systems have existed for some time. An account can be defined as one or more insurance policies of an insured which are billed and managed together. These batch processing techniques are used to update accounts, e.g. establish receivables, credit payments made to existing or new accounts, change account information and generate appropriate communications for example. These batch processes are typically run at predetermined intervals, e.g. once each cycle. A cycle can be defined as a 24 hour period or any other period defined by business practices for example.

As is well known, during batch processing, access to any account that will be processed with the batch typically must be disadvantageously denied. In other words, accounts to be processed with the batch need to be locked for the duration of processing that batch. Thus, batch processing systems conventionally require these accounts to be locked for a significant amount of time to permit completion of the entire batch, even though processing for any individual account in the batch typically only takes a small percentage of the batch duration. This is because multiple simultaneous access to an account must be avoided to ensure account reliability and confidence, and because there is no conventional way of knowing which account in a batch is currently being processed or will be processed next. Accordingly, access to all accounts that will be effected by the batch process is conventionally denied, e.g. these accounts are locked, for the entire duration of the batch process. Accordingly, these batch processes are typically run in off-hour, when access to account information has traditionally not been required.

For any number of reasons however, as is the case with many industries today, off-hour periods are rapidly being reduced in magnitude and frequency. Hence, opportunities to execute such batch processes, and windows of opportunity for completing them, are rapidly diminishing.

Additionally, it is desirable to have a management and processing system capable of operating in real-time. In other words, it is desirable to have an account management system that fully processes an account as actions are performed in relation to it. As is understood by those possessing ordinary skill in the pertinent art, conventional batch processes are typically incompatible with such a system, as account processing is delayed until an entire batch is run.

A further drawback of conventional batch processing lies in the realization that if any errors or problems are encountered during the batch process, typically the entire batch process must be repeated. In other words the batch in its entirety typically passes or fails.

SUMMARY OF INVENTION

A method and system for emulating online-like transaction processing of account information contained in batch process files, the method including: reading at least one batch file containing a plurality of records, each of the plurality of records being related to an associated one of a plurality of accounts; identifying which of the plurality of records relate to same ones of the plurality of accounts; identifying one of the accounts, and, processing all of the records identified as relating to the one of the accounts prior to processing any of the records relating to any other of the plurality of accounts.

BRIEF DESCRIPTION OF THE FIGURES

The advantages and aspects of the present invention will be more fully understood in conjunction with the following detailed description and accompanying drawings, wherein.

DETAILED DESCRIPTION OF THE INVENTION

The present invention is a method for processing otherwise batch files using a pseudo-online transaction processing (OLTP) technique (online-like technique) and then providing outputs as batch files. The present system is particularly useful for Receivables Management Services (RMS) in a billing application of insurance policy holders. The present invention essentially enables access to accounts by persons and other systems nearly 24 hours a day, 7 days a week, 52 weeks a year. The present invention further allows for the processing window or time frame to become scalable as a function of volume. Essentially, the present invention changes the nature of batch processing, moving overnight processes to an online-like model capable of running anytime. It also allows for a method for splitting the continuous operational aspects of the processing from reporting and backup processes.

Figure 1:
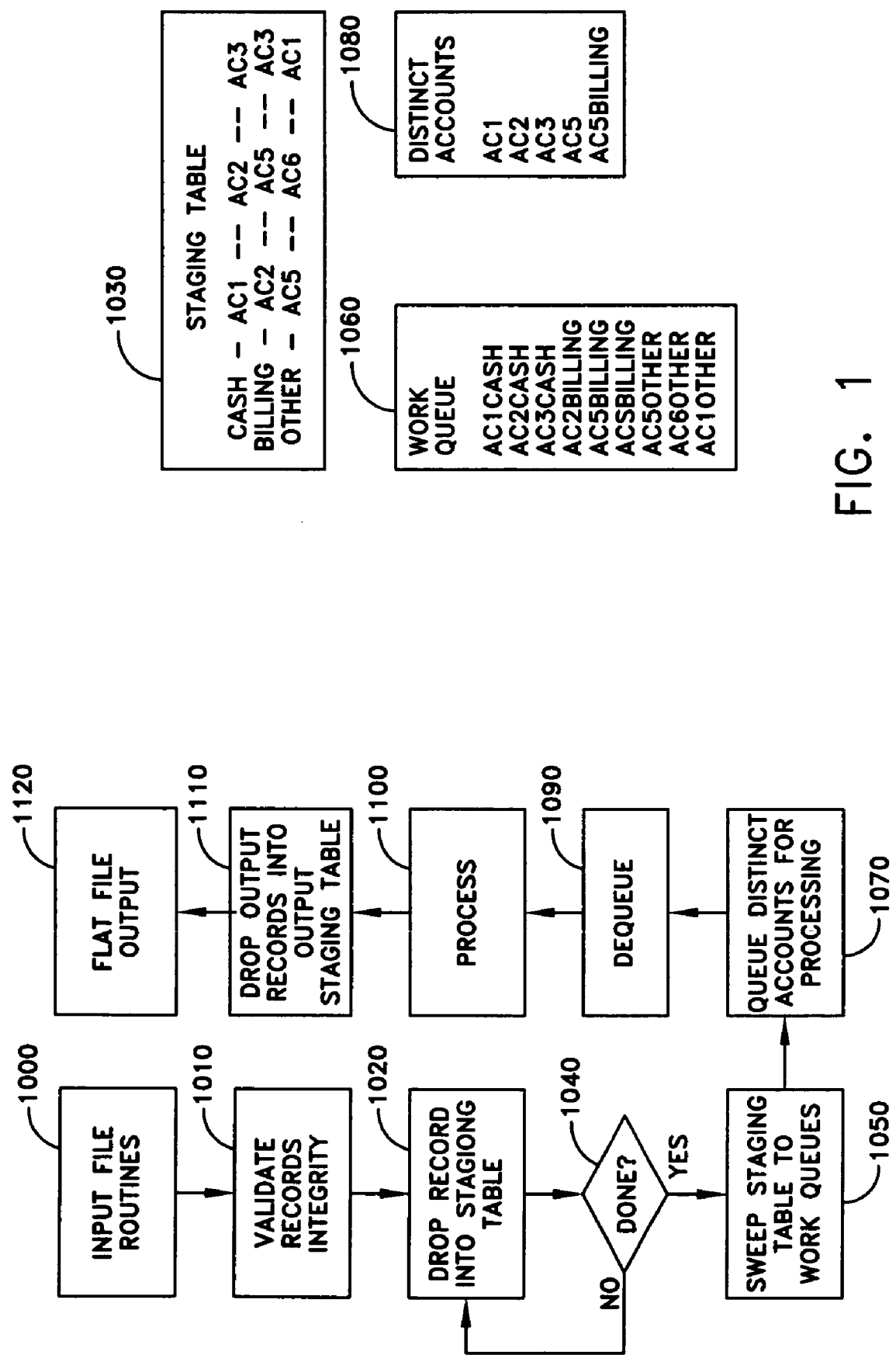
FIG. 1 illustrates an overview of account level processing according to a preferred form of the present invention.

FIG. 1 illustrates an overview of account level processing according to a preferred form of the present invention. One or more files are fed 1000 from a flat file or batch source that contains a daily journal of cash, premiums and accounts to be billed for example. This can be accomplished utilizing tape records for example. The present invention reads the input files, and validates the records' integrity 1010.

The validated records are staged 1020 in a staging table 1030 according to cash, billing and other queued up jobs as staged records (AC1, AC2 . . . ). These staged records preferably include a level of detail sufficient to enable processing of the accounts to which they relate, e.g. are effected by the transaction reflected in the record.

After all records are staged 1040, the system sweeps 1050 the staging table 1030 and creates work queue 1060 which includes index-like entries which identify each of the records staged to table 1030. The next step 1070 generates distinct accounts table 1080 by scanning the work queue 1060 and identifying each unique, or distinct account found therein regardless of the number of entries found in the work queue 1060 corresponding to it. According to the present invention, records from staging table 1030 are selected for processing by dequeuing 1090 entries from work queue table 1060 according to entries in the distinct accounts table 1080. More particularly, the next account to be processed is dequeued from the distinct accounts table 1080, the work queue 1060 is scanned for entries for that selected account, and the corresponding entry in the staging table 1030 is processed 1100 for each entry found for the selected account in work queue 1060. Processing 1100 includes debiting accounts for payments received, reconciling total cash input and creating bills for example. Results may be updating a customer's payment record or sending out a customer bill for example. Records indicative of these results are then staged 1110 to at least one output staging table, and the output staging table is fed out for further processing 1120 at preselected intervals or upon predetermined events consistent with design criteria.

In other words, by changing the unit of work from a batch file to an individual account, the present invention simulates online transaction processing for each individual account. This represents a significant departure from conventional batch processing methodology. One or more flat files which each includes sequential records with traditional headers, trailers and balancing data, and reflecting account activities for example, are supplied to the present system consistently with those provided a conventional batch processing system. Therefore, legacy front end user interfaces and data entry systems and techniques advantageously need not be changed to implement the present invention.

The primary data feeds used as input at step 1000 include cash and premiums information, as well as a few additional data feeds in the preferred embodiment. These data feeds can be supplied as flat files or database tables for example. By staging the input data 1020 to one or more staging tables 1030, individual records may be screened, updated, sorted, edited or deleted for example. As is understood by those possessing ordinary skill in the art, multiple records can often relate to a single account. A particular example being where payments are due for multiple policies of a single insured, e.g. home and automobile.

During dequeuing 1090, the account to be processed at step 1100 is locked out, and each record in the one or more staging tables 1030 that relates or effects it is processed such that all records that relate to that single account are processed together before any records that relate to other accounts are processed. In this way, all transactions that effect a given account are processed together, and the remaining accounts which will not be effected by the processing need not be locked. When processing 1100 of all records in staging table 1030 which relate to the single account being processed are completed, that account can be unlocked and another account locked for processing. In this way, the present invention enables all accounts except the one being immediately processed to remain unlocked and hence accessible to access or other processes. In contrast to batch systems, where all of the accounts to be processed must be locked for a significant amount of time to permit completion of the batch, the processing of any one particular account often only takes a small amount of time (often only seconds). Accordingly, each account to be processed is only locked for a negligible amount of time during a given cycle and is hence available nearly 24 hours per day, 7 days a week, 52 weeks per year.

Once all records in staging table 1030 that relate to the account being processed have been processed 1100, output flat files are preferably created 1120 as batch processing data feeds to other legacy processes and system. In this way, legacy batch processing systems which utilize the output of the present invention system and method advantageously need not be immediately updated or replaced.

It should be understood, that as the present system and method processes accounts individually, and while the preferred embodiment disclosed herein is advantageously backwards compatible in that it is operable with legacy batch processing front and back ends, it is recognized the present invention is suitable for use with real-time front and back ends as well.

Figure 2:
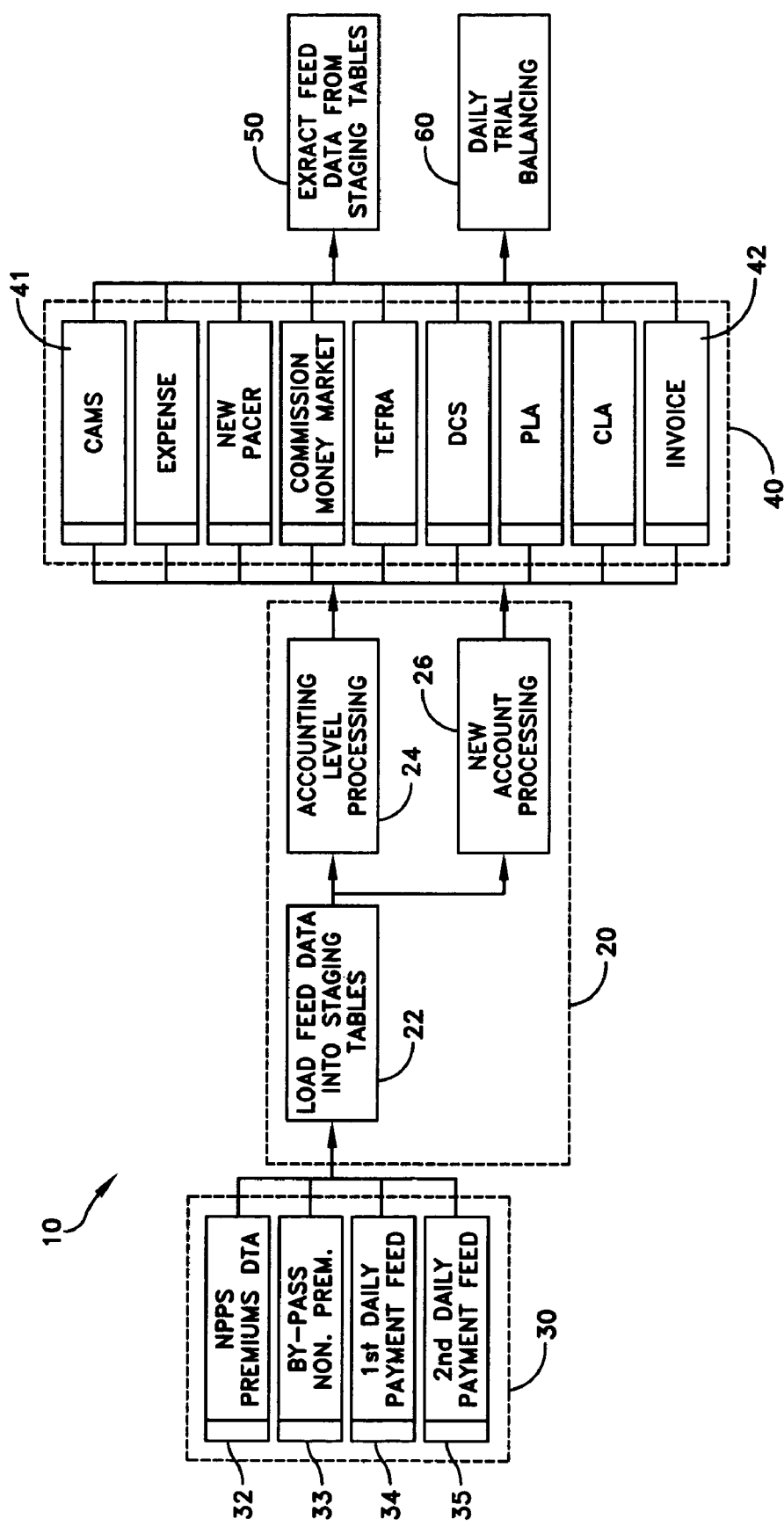
FIG. 2 illustrates an overview of a on-online transaction processing emulation cycle utilized according to a preferred embodiment of the present invention.

Referring now also to FIG. 2, therein is illustrated an overview of an online transaction processing (OLTP)-like cycle 10 utilized according to a preferred embodiment of the present invention. The cycle 10 includes data feeds 30, processing stage 20 and post processing output staging tables 40. As individual accounts are processed at processing stage 20 using data supplied by feeds 30, other processes will need to be called as is well understood. The present invention addresses this reality by entering records in output tables 40 to be supplied to these appropriate further processes. Of course, other methods of providing data to other systems or subjecting that data to other processes could alternatively be utilized. In other words, processing at stage 20 for a particular account may indicate that collection procedures should be invoked. In such a case, an entry is made in CAMS table 41 which is fed to the CAMS system. A description of the CAMS system can be found in commonly assigned U.S. Pat. No. 5,991,733 entitled "METHOD AND COMPUTERIZED SYSTEM FOR MANAGING INSURANCE RECEIVABLE ACCOUNTS", issued Nov. 23, 1999, the entire disclosure of which is hereby incorporated by reference as if being set forth in its entirety herein. The output tables 40 are swept and the data contained therein fed 1120 to other-post processing stages at extract feed data stage 50 and a trial balance for the account is determined for accounting purposes at trial balance generation stage 60. According to the preferred embodiment as is illustrated in FIG. 2, data feeds 30 which are input 1000 include: premiums or NPPS data feed 32; non-financial data or by-pass data feed 33; and, cash or payment feeds 34 and 35. Preferably, one of the payment feeds 34, 35 includes in-house financial transactions while the other includes financial data from financial institutions such as banks and credit unions.

Incoming data from feeds 30 is preferably processed in two waves. The first wave processes all data for each preexisting account, this is referred to as account level processing 24. The second wave processes data from NPPS feed 32 and by-pass feed 33 that was not processed during account level processing 24 because an account identifier, such as account number, was not preexisting, e.g. they relate to new accounts. This second wave of processing is called new account processing 26. As will be understood by those possessing ordinary skill in the pertinent art, the majority of data processed by processing stage 20 will be handled by account level processing 24. The new account processing 26 enables new accounts to be entered into the system, so they may be treated in future iterations using account level processing 24. As was discussed relating to FIG. 1, the data form feeds 30 is loaded 1000 and staged 1020, onto one or more staging tables 1030 at staging stage 22.

Figure 3:
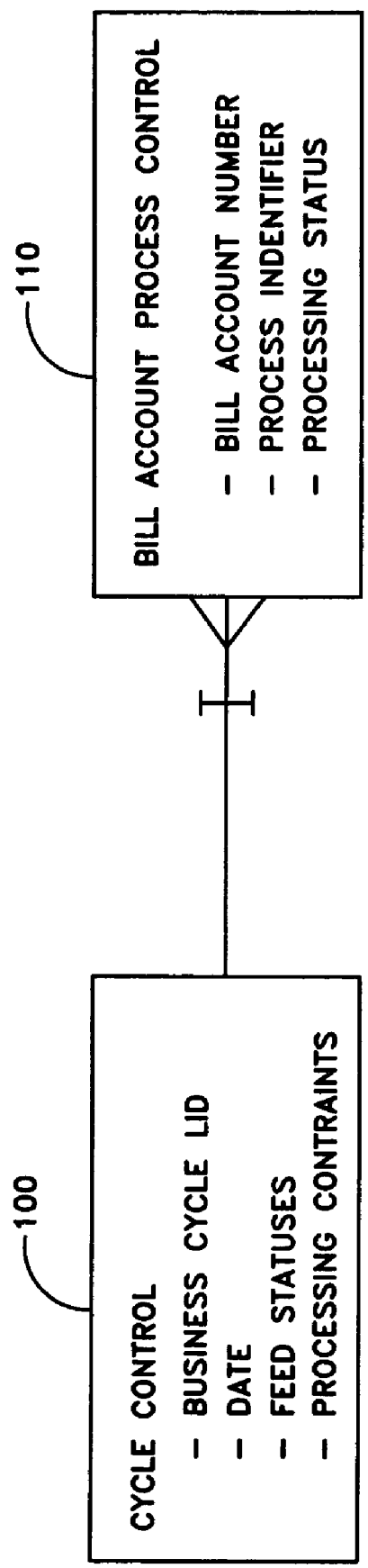
FIG. 3 illustrates an interaction between cycle control and bill account processing control according to the present invention.

Referring now also to FIG. 3, therein is illustrated the inter-relation of cycle control 100 and bill account process control 110. The cycle control structure 100 controls what business cycles are being run, e.g. a daily cycle for Monday for example. The cycle control 100 preferably uses: a business cycle ID to indicate what cycle is being run, the account date which is utilized to determine, whether a record has been processed during a past cycle and define starting and ending constraints for the cycle, feed statuses to determine which of feeds 30 are currently available, and other processing constraints such as financial balancing and financial controls for example. Bill account process control 110 manages accounts identified as ones which still need to be processed during the cycle identified by cycle control 100. For each individual account being processed, the control 110 tracks: the bill account number for the account currently being processed, a process identifier for identifying what process the current account is undergoing; and, a process status for determining the status of the present process. In other words, bill account process controls 110 controls dequeuing 1090 from work queue 1060. The bill account process control further serves to lock the account currently being processed 1100 to prevent multiple access to that single account. It should be noticed there are typically many accounts which are processed responsively to bill account processing control 110 for each cycle identified by cycle control 100.

It should also be understood that once configured, cycle control 100 is mainly autonomous in that it follows a scheduled course of events. However, changes often need to be made to processing cycles for one or more reasons as are recognized by those possessing ordinary skill in the art. An example being such as when a national holiday falls on what would otherwise be a scheduled cycle day. In such a case, a cycle scheduled for that day may need to be postponed for business reasons. In a preferred form, an administrator can interact with the cycle control 100 to reschedule or cancel cycles for example.

Figure 4:
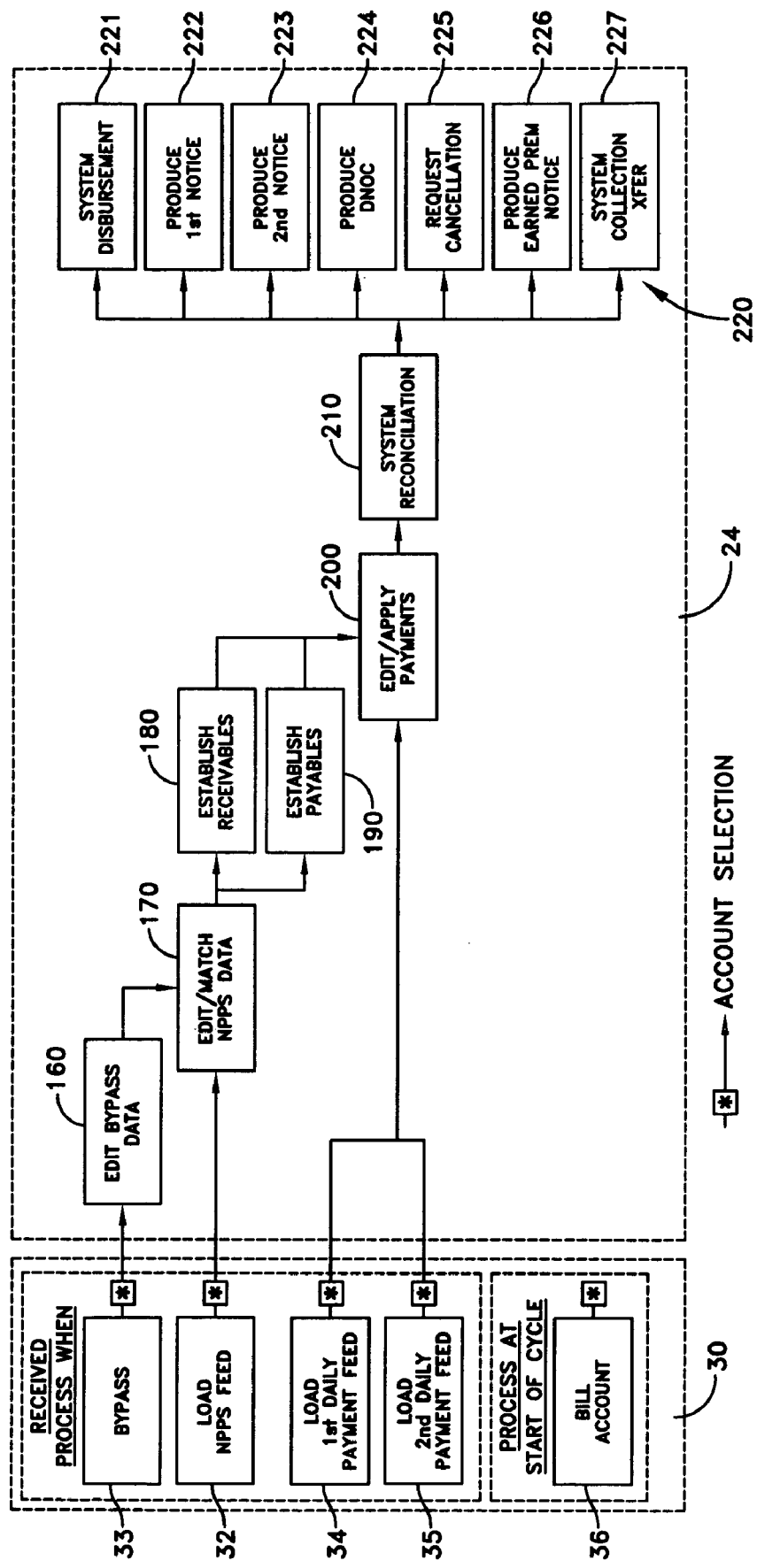
FIG. 4 illustrates a more detailed view of on-line account level transaction processing emulation according to the present invention.

Referring now also to FIG. 4, therein is illustrated a more detailed view of a preferred form of online-like account level transaction processing 24 according to the present invention. As set forth the data feeds 30 are individually supplied to account level processing stage 24. Records from each of the feeds 30 are selected for processing as has been set forth regarding FIG. 1, e.g. the data feeds are staged 1020, swept to create work queues 1060, distinct accounts are queued up 1070 and records from staging table 1030 corresponding to dequeued entries 1090 from work queue 1060 are selected for processing 24. For each individual account selected to be processed 1100 using account level processing 24 according to the present invention, if available, non-financial, or bypass data 33 is first loaded and scrubbed, or edited to verify critical components thereof, e.g. select fields contain valid data, at step 160. It should be understood this alternatively can be performed during validation 1010 as set forth regarding FIG. 1. The bypass data 33 includes contact information, e.g. name and address, for example. Premiums data 32 is then loaded and matched 170 with scrubbed data 33. Premiums data preferably includes an account number and insurance policies information for example. By matching 170 scrubbed data 33 with premiums (NPPS) data 32, contact information as well as policies information is matched up, and both are available for the processing 24. The establish receivables and establish payables steps 180 and 190 are terms used in the art for determining what payments are due and what amount is actually owing as of the time of processing 24. A common example of implementing these steps is seen when an insurance company determines how much money is owed by an insured for a policy term, and what the current amount due of that amount owed is, e.g. a one year automobile insurance policy having 12 monthly or 4 quarterly payments due. After completion of the steps 180 and 190, it is established what amounts are due for the account currently being processed at present.

Feeds 34 and 35 are utilized by account level processing 24 at apply payments step 200 and system reconciliation step 210. At step 200 payments received are applied 200 against account receivables and payables which have been established at steps 180 and 190. At reconciliation step 210, the account is reconciled, e.g. deficiencies or overpayments for the account being processed are determined, so data may be fed to appropriate ones of the tables 40. Before entries are made in tables 40, or another account is locked for processing though, the system loads feeds 30 that were determined to include additional transactions relating to the current account by scanning work queue 1060 during dequeuing 1090. When no further records within staging table 1030 correspond to the account currently being processed, entries are prepared for output staging tables 40.

Further processing 220 is performed to generate appropriate entries for tables 40. An entry is made using function 221, system disbursements, when reconciliation at step 210 determines overpayments have been made and an amount should be refunded. An entry is made using function 222 when a first notice that a payment is due should be produced according to business practices. This can be in response to the current business cycle as determined by cycle control 100 corresponding to the billing day for an account. Such records can be introduced through data feed table 36, bill account. The account selection process makes appropriate entries in the staging table 1030 for these accounts. An entry is made using function 223 when a second notice that a payment is due should be produced as determined by processing 24 and reconciliation 210 particularly. Likewise, an entry is made using function 224 when a direct notice of cancellation (DNOC) should be prepared. Similarly, an entry is made using function 225 when cancellation of a policy if a payment was not received should be invoked. As is understood by those possessing ordinary skill in the pertinent art, this typically causes another premiums record to be entered in the NPPS, or premiums feed 32. When a cancellation is effected, an entry is made using earned premiums function 226. And, if earned premiums are not billed and collected, transfers to collections can be effected by suitable entries being made using function 227. It should be understood that the further processing steps to actually perform these tasks are well understood and currently implemented by many business entities and that all appropriate processing for each individual account for the present business cycle is performed before the account is effectively released and the output tables 40 converted 50 for transfer to other systems. It should be understood these functions are merely exemplary and not all encompassing, as many other functions can be utilized which implement suitable business logic according to the present invention. For example, function 222, produce first notice, causes an appropriate entry to be made in invoice output staging table 42 as is illustrated in FIG. 2.

Figure 5:
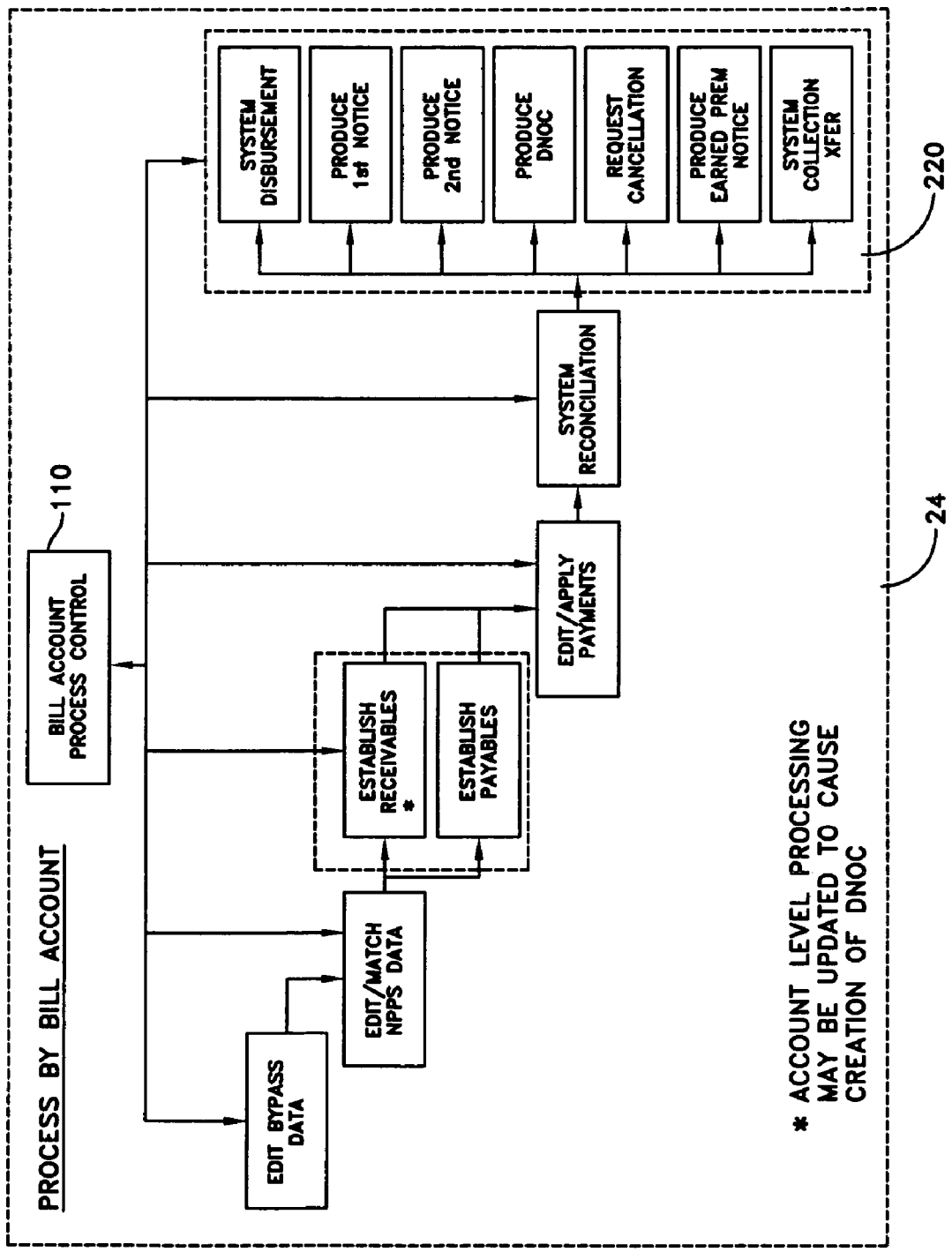
FIG. 5 illustrates interaction between a control account level processing component and account level processing according to the present invention; and, FIG. 6 illustrates an interaction between cycle control, bill account process control and an account level processing stage processing.

Referring now also to FIG. 5, therein is illustrated the preferred relationship between the bill account processing control 110 and account level processing 24. Processing 24 is launched and executed responsively to bill account processing control 110. The bill account process control structure 110 causes the appropriate processes for a given account to be executed from start to finish. When the given process is executed the status is appropriately updated.

It should be understood, that during the establish receivables process 180, a cancellation can cause the bill account off cycle date to be set to the current date. This causes an entry to be made in the bill account process control structure 110 for that account insuring that system reconciliation and billing will be done.

Figure 6:
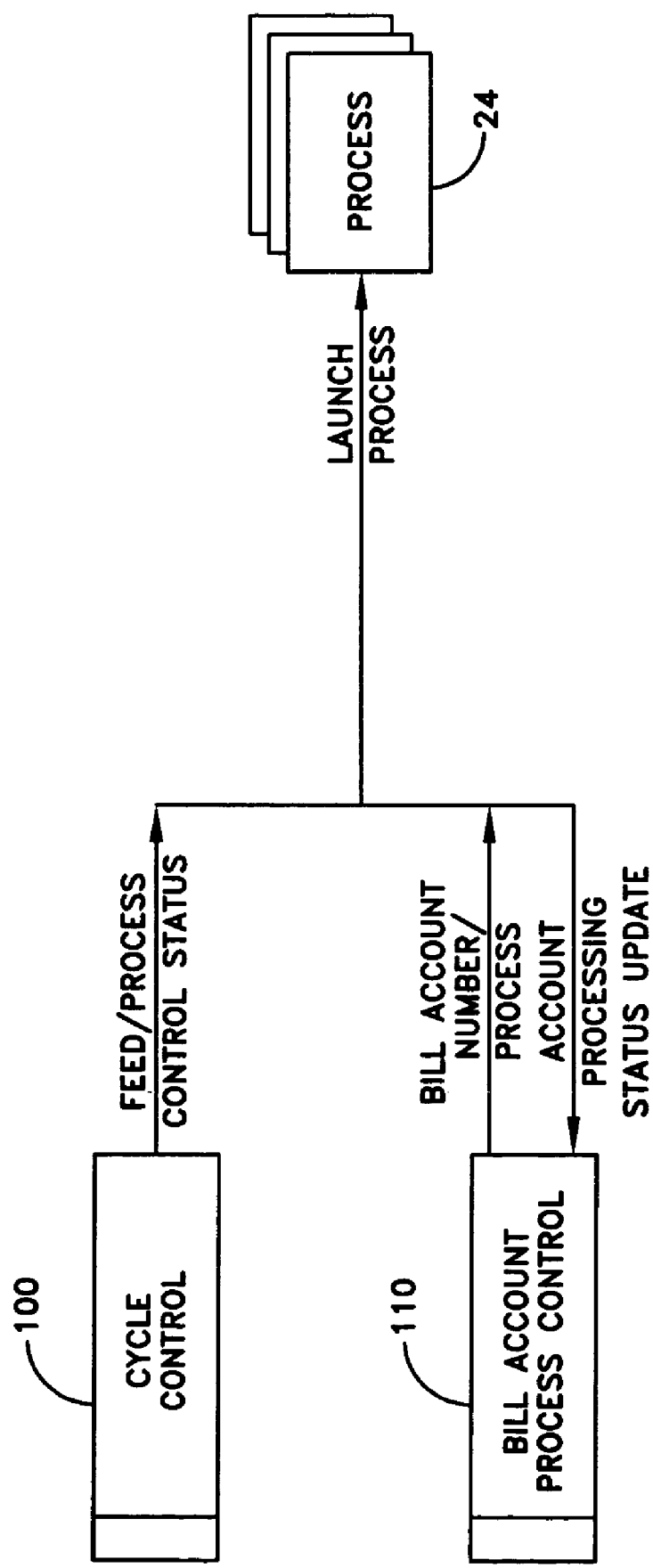

Referring now also to FIG. 6, therein is illustrated a more detailed view of the interaction between cycle control 100, bill account processing control 110 and processing 24. As set forth, the cycle control 100 identifies and controls what cycles are being executed. Bill account process control 110 determines and controls which accounts will be processed 24 and locks and unlocks the account actually being processed.

It should be understood in the referred form many processes 24 can be run in parallel to speed processing 1100 of the work queue 1060 using conventional methodology. In such a case only those accounts currently being processed by one of the parallel systems are locked, as each system essentially runs autonomously using a common staging table 1030, work queue 1060, distinct accounts table 1080 and output staging tables 40.

The hardware utilized in the new system preferably includes a database server (four Compaq GS 140s), an I/O subsystem utilizing an EMC Symmetrix Array having 3.7 Terabytes, 3-way mirror; cluster technology utilizing a Compaq Tru-Cluster and a Tape back-up System utilizing a Compaq ESL9326. The systems software preferably operates an Oracle 8i database. Of course, it should be understood these are merely a matter of design choice and is not intended to limit the scope of the invention to the equipment denoted.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. It is intended that the patent shall cover by suitable expression in the appended claim, whatever features of patentable novelty exist in the invention disclosed.

We claim:

1. A method for processing account information comprising:

reading by the processor at least one file containing a plurality of records, wherein each of said plurality of records is associated with one of a plurality of accounts, and at least two of the records are identified with a common one of the accounts;

restricting by the processor access to the common account;

processing by the processor each of the records identified as relating to the common account prior to processing records relating to others of said plurality of accounts; and unrestricting by the processor access to the common account after all of the records identified as related to the common account are processed; and processing by the processor others of the records identified as relating to others of the accounts.

2. The method of claim 1, further comprising:

creating a work queue which includes index-like entries which identify each of the plurality of records that relate to the common account; and selecting the common account in accordance with a control cycle.

3. The method of claim 2, further comprising reporting the results of processing of each selected account.

4. The method of claim 2, further comprising storing the results of processing of each selected account.

5. The method of claim 2, further comprising validating said records.

6. The method of claim 2, further comprising selecting preexisting ones of said accounts prior to new ones of said accounts.

7. The method of claim 2, wherein the control cycle is selected from the group consisting of: daily, day specific, weekly, monthly, quarterly and yearly.

8. The method of claim 2, wherein the processing comprises debiting said common account.

9. The method of claim 2, wherein the processing comprises reconciling said selected account.

10. The method of claim 2, wherein the processing comprises creating bills.

11. The method of claim 2, wherein the processing comprises determining disbursements.

12. The method of claim 2, wherein the processing comprises generating notices.

13. The method of claim 2, further comprising backing up said common account.

14. The method of claim 13, wherein said backup occurs at preselected intervals.

15. The method of claim 13, wherein said backup occurs upon detection of a predetermined event.

* * * * *